July 30, 1946.  F. J. LOWEY  2,404,808

METHOD OF MAKING BEARINGS

Filed May 31, 1943

FRANCIS J. LOWEY
INVENTOR.

BY C. Thomas Cox
ATTORNEY.

Patented July 30, 1946

2,404,808

UNITED STATES PATENT OFFICE 2,404,808

METHOD OF MAKING BEARINGS

Francis J. Lowey, Olmsted Falls, Ohio, assignor to The S. K. Wellman Company, Cleveland, Ohio, a corporation of Ohio Application May 31, 1943, Serial No. 489,132

2 Claims. (Cl. 29—149.5)

This invention relates to annular bimetallic members and in particular to bearings of the type having sintered powdered metal facings integrally bonded to a reinforcing member of solid metal such as steel or copper, and further relates to methods of making the same.

Annular, cylindrical bearings of the type having a backing member of solid metal and a facing of bearing metal alloy are frequently called upon to receive both axial and radial loads. Therefore, it is customary to provide the backing with cylindrical and radial surfaces in contiguous relation and to provide a lining of bearing metal for each surface. Thus, large annular, cylindrical bimetallic bearings used for the main or connecting rod bearings of Diesel engines are provided with a flange or shoulder at one or both ends thereof to receive end thrust from the shaft that is journaled in the bearing. Similarly, annular flat washers of the type known as thrust bearings are often provided with a lining of bearing material on the inside diameter as well as on the radial faces. While the lining on the inside diameter may not have a cylindrical bearing surface, it is utilized to receive the radial components of loads imposed on the bearing. In most of these bearings, it is either essential or desirable that the two bearing surfaces which are at angles to one another should meet or join in a smoothly rounded corner for conformity with the shaft journaled in the bearing and to reduce the danger of chipping of the corner during handling and installation.

The production of these two contiguous bearing surfaces, while not a simple matter, has been satisfactorily solved in the case of steel-backed bearings having a cast lining of babbitt or other bearing alloy. However, for certain applications involving poor lubrication and excessive heat, a cast alloy lining has not been found to be suitable, and it would be desirable to resort to a newer type of lining formed by sintering a powdered mixture of metallic and nonmetallic materials. These sintered bearing materials have been quite satisfactory in bearings having a facing on a single surface, but their use on two contiguous surfaces has not been possible heretofore due to the difficulties of manufacture.

It is a relatively simple matter to produce a small bearing having two bearing facings at angles to one another from sintered powdered material alone, but the present practical necessity of using a steel backing for the material to provide the strength required is responsible, to a great extent, for the limited application of powdered metal bearings. This is particularly true where a bearing of large diameter is desired. While bimetallic bearings having only a cylindrical surface to receive a facing can be produced by directly briquetting a layer of powder against the cylindrical surface of the steel backing and then heating the powder and backing to a temperature sufficient to sinter the powder and bond it to the backing, the high pressures necessary and the large presses required limit the process to the production of small size bearings. Furthermore, it has not been found practical to provide a lining for a substantially radial surface contiguous to a lined cylindrical surface of the backing and joined to the latter lining by a smoothly rounded corner.

It is an object of this invention to provide a new and improved bimetallic bearing which has the advantages and desirable characteristics of the sintered powdered metal bearings and which is provided with a bearing facing on two contiguous surfaces thereof.

It is a further object of the invention to provide a new and improved flanged, bimetallic bearing having sintered powdered metal integrally bonded to the inner surface of the bearing and to the face of the flange and having the bearing surfaces meeting in a smoothly rounded corner.

Another object of the invention is the provision of a new and improved method by which the improved bearings can successfully be produced and that is capable of producing bearings of large size.

Other and further objects and advantages of the invention will be apparent from the following description taken in conjunction with the accompanying drawing in which.

Figure 1:
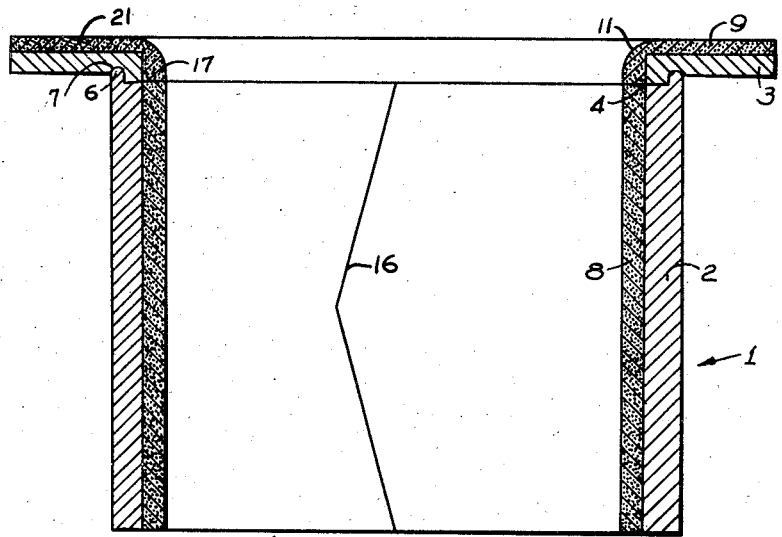
Fig. 1 is a longitudinal section of an annular, cylindrical, bimetallic bearing.

Referring now to Fig. 1, there is illustrated a large bimetallic bearing, designated generally as 1, of annular, cylindrical configuration. This bearing is made up of two parts which comprise the shell or circular portion 2 and the end flange 3. The shell 2 and flange 3 are disposed in contiguous relation at the joint 4, a tongue 6 on the shell 2 fitting in a groove 7 in the flange 3 to locate the parts in proper relation.

The shell 2 and flange 3 are formed from solid metal such as steel or copper, and each is provided with a facing or bearing surface of sintered powdered material integrally bonded thereto, the shell 2 having a lining 8 and the flange 3 having a lining 9. The lining 9 is made up of the annular, cylindrical facing 17 and the annular, radial facing 21 which meet in a rounded inner corner 11 in conformity with the shape of the usual fillet on the shaft to be journaled in the bearing. The flange 3 and its lining 9 are adapted to be engaged by a radial surface provided by a shoulder on the shaft. As is clear from Fig. 1, the inside diameters of the sintered facing of the flange and shell are identical so that the inner surface of the cylindrical portion 17 of the flange forms a continuation of the inner surface of the facing 8 of the shell.

Figure 2:
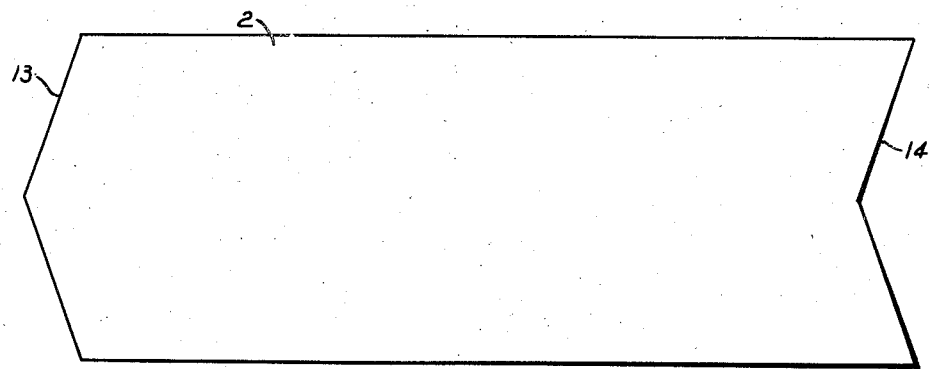
Fig. 2 is a plan view on a reduced scale of a bimetallic blank suitable for forming the cylindrical portion of the bearing of Fig. 1.

The cylindrical portion comprising the shell 2 and its lining or facing 8 may be formed in any suitable manner, but I prefer to construct it from a flat bimetallic blank, such as shown in Fig. 2, which is provided with a point 13 at one end and a notch 14 at the other end thereof. The blank 2 is readily formed by the methods of powder metallurgy since it is a relatively simple matter to produce a flat bimetallic blank. One suitable method is disclosed in Wellman Patent No. 2,178,527, issued October 31, 1939, in which a thin flat briquet is formed from a suitable powdered mixture and placed onto a properly prepared surface of the steel backing. The unit is then heated under pressure to sinter the powdered material and integrally bond it to the facing. The resulting bimetallic blank may be cut to the shape shown in Fig. 2 and rolled to cylindrical form, the point 13 engaging the notch 14 to form a V-shaped joint 16. If desired, the two ends of the segment may be secured together by welding or brazing, but this is not essential since the tongue 6 and groove 7 will serve to retain the shell in cylindrical form. The point 13 and notch 14 serve not only to align the ends of the blank but also to eliminate a straight axial joint. While a V-joint is shown, it is obvious that any diagonal joint that will serve to gradually distribute the load from one end of the blank to the adjacent end can be used. This subject matter is described in greater detail in copending application S. N. 484,734, filed April 27, 1943, of Nathan M. Lawless.

Figure 3:
Figs. 3–5 are sectional views on a reduced scale of the flange of the bearing of Fig. 1 illustrating the progressive steps in the manufacture of the same.
Figure 4:
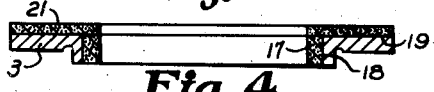
Figure 5:
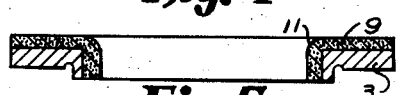

In Figs. 3–5, are illustrated the sequential steps in the production of the flange 3 and its facing 9. As shown in Fig. 3, the flange 3, after machining to suitable contour, is provided with a facing 17 on the inside diameter thereof. To accomplish this, the inside or annular, cylindrical surface 18 and the radial surface 19 of the flange 3 are cleaned by pickling or sandblasting and are preferably given a thin coating of a protective metal, such as copper or nickel. Then, a cylindrical facing 17 of sintered powdered metal is pressed into the flange. This facing 17 is prepared by sintering a compressed mixture of metallic and nonmetallic materials and has an outside diameter such that it makes a tight fit with the inside diameter 18 of the flange.

The next step is illustrated in Fig. 4 and comprises the placing on the clean and plated radial surface 19 of the flange 3, and in contact with the facing 17, an annular, flat, radial facing 21 of briquetted powdered metal. This facing 21 has an inside diameter equal to or less than the inside diameter of the cylindrical facing 17.

The assembled unit illustrated in Fig. 4 comprising the flange 3 and facings 17 and 21 is then heated in a protective atmosphere, preferably while pressure is applied to clamp the facing 21 to the flange 3, to a sufficient temperature and for a sufficient length of time to sinter the facing 21 and cause the facings 17 and 21 to unite and to integrally bond to the surfaces 18 and 19 of the flange 3. This bonding step may be accomplished in any suitable heat treating furnaces in which the proper conditions for sintering and bonding may be produced; however, I prefer to utilize a furnace such as described in Wellman Patent No. 2,258,431, issued October 7, 1941. This furnace is adapted to receive a vertical stack of assembled solid metal backing members and powdered metal facings and to apply pressure and heat thereto in a protective atmosphere to sinter the powdered metal and bond it to the backing member. As disclosed in that patent, each unit comprising a backing member and facing is separated from the adjacent units by a sheet of graphite-covered steel or other suitable material adapted to prevent sticking together of the units.

The next step is illustrated in Fig. 5 and comprises the machining of the completed article to finished dimensions, the major purpose being to provide the rounded corner 11. In some instances, this step may be omitted as where a right angle corner is not objectionable.

While I have described the cylindrical facing 17 as being sintered before insertion in the flange 3 and the radial facing 2 as merely being briquetted, it is obvious that in both cases the facing may be merely briquetted or may in addition be sintered if desired. However, I have found that sintering of the facing 17 before insertion in the flange is desirable so that it will have sufficient strength to withstand the forces imposed upon it when it is pressed into place. The unexpected result of the process is that the finished article shows no line of demarcation between the facing 17 and the facing 21, the sintering and bonding operation serving to completely obliterate the joint.

As a suitable mixture for the powdered metal facings of the bearings, I contemplate the use of any of the usual mixtures employed in the art of powder metallurgy. As an example, I have found that the following mixture of powders is satisfactory:

| | Per cent by weight |
|---|---|
| Cu | 80 |
| Sn | 11 |
| Pb | 3 |
| Graphite | 6 |

This mixture when briquetted at a pressure of about 11 tons per square inch and sintered in a nonoxidizing atmosphere at a temperature of about 1450° F. will produce a suitable sintered bearing facing. If it is held against a properly prepared surface of a solid metal backing under a pressure of about 100 pounds per square inch during the sintering step, it will integrally bond thereto.

The bearing 1 of Fig. 1 has been shown and described as made up of two parts, but it is contemplated that a one-piece steel backing may be used. In other words, the shell 2 and flange 3 may constitute an integral member or flanged annular cylinder. In this case, a separate long cylindrical facing could be inserted in the bearing to provide both the facing 8 of the shell and the facing 17 of the flange.

The flange 3 and its facing 9 of the bearing of Fig. 1 is adapted for use other than with the lining shell 2. For example, the member may be used separately as a thrust washer or it may be used in combination with a cylindrical portion 2 having a cast metal lining.

Figure 6:
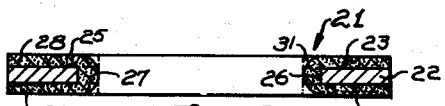
Fig. 6 is a sectional view of a modification.

In Fig. 6, I have generally illustrated at 21 a modified type of flange which is adapted to be used alone as a thrust bearing. In this figure, a substantially flat annular core 22 of steel or other suitable solid metal is provided with radial surfaces 23 and 24 and a cylindrical or axial surface 26 at right angles thereto. These three faces are provided with a bearing facing or lining 25 of sintered powdered metal integrally bonded to the core 22 by the method illustrated in Figs. 3–5, the only difference being that in the step illustrated in Fig. 4, a facing is disposed on the lower side of the core as well as on the upper side before the unit is heated to sintering and bonding temperatures. In other words, the facing 25 is made up of the separate pieces 27, 28, and 29, the dotted lines showing their contour at the end of the sintering step and prior to the final machining step.

The bearing 21, after the sintering and bonding step, is machined to provide the rounded contour 31 on both upper and lower corners, but it is apparent that only one or neither corner need be machined for certain applications.

It will be understood that the various modifications described above have been chosen merely to illustrate the invention and should not be regarded in a limiting sense since other modifications will occur to those skilled in the art. It is accordingly desired that the invention be restricted in scope only by the following claims.

I claim:

1. The method of lining annular, cylindrical solid metal backing members having a cylindrical inner surface and a radial surface in contiguous relation comprising the steps of pressing metal powder to form an annular cylindrical facing of outside diameter slightly larger than the diameter of said cylindrical surface; forcing said annular facing into said backing; pressing metal powder to form an annular, radial facing of inside diameter substantially equal to the inside diameter of said cylindrical facing; placing said radial facing on the radial surface of the backing member and in contact with the cylindrical facing; and heating said assembled facings and backing to sinter and unite the facings and bond them to the backing.

2. The method of claim 1 including the step of sintering said pressed cylindrical facing prior to insertion in the backing member.

FRANCIS J. LOWEY.